(12) United States Patent
Ahn et al.

(10) Patent No.: US 9,844,155 B2
(45) Date of Patent: Dec. 12, 2017

(54) DISPLAY PANEL AND DISPLAY APPARATUS HAVING THE SAME

(71) Applicant: Samsung Display Co., LTD., Yongin, Gyeonggi-Do (KR)

(72) Inventors: Byeong-Jae Ahn, Asan-si (KR); Ju-Hyeon Baek, Asan-si (KR); Dong-Wuuk Seo, Asan-si (KR); Bong-Jun Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 636 days.

(21) Appl. No.: 14/312,857

(22) Filed: Jun. 24, 2014

(65) Prior Publication Data
US 2015/0195924 A1 Jul. 9, 2015

(30) Foreign Application Priority Data
Jan. 6, 2014 (KR) .......................... 10-2014-0001197

(51) Int. Cl.
*H05K 5/00* (2006.01)
*H05K 5/02* (2006.01)
*G02F 1/1333* (2006.01)

(52) U.S. Cl.
CPC ......... *H05K 5/02* (2013.01); *G02F 1/133308* (2013.01); *G02F 2001/13332* (2013.01); *G02F 2001/133328* (2013.01); *G02F 2201/46* (2013.01)

(58) Field of Classification Search
CPC ...... H05K 5/02; H05K 5/0213; H05K 5/0239; H05K 5/04; H05K 5/061; H05K 5/0017; H05K 5/0217; G02F 1/133308; G02F 2001/13332; G02F 2001/133328; H04M 1/0266

See application file for complete search history.

(56) References Cited

U.S. PATENT DOCUMENTS

| | | | |
|---|---|---|---|
| 5,703,665 A * | 12/1997 | Muramatsu | G02F 1/133308 349/58 |
| 5,985,359 A | 11/1999 | Jeung | |
| 7,378,685 B2 | 5/2008 | Lee et al. | |
| 9,583,046 B2 * | 2/2017 | Shimizu | G02F 1/133308 |
| 9,671,630 B2 * | 6/2017 | Jeong | G02F 1/133308 |
| 9,696,571 B2 * | 7/2017 | Fujii | G02F 1/133308 |
| 2006/0158579 A1 | 7/2006 | Hasegawa | |
| 2007/0195225 A1 * | 8/2007 | Lee | G02F 1/133308 349/65 |
| 2008/0100770 A1 * | 5/2008 | Chen | G02F 1/133308 349/58 |

(Continued)

FOREIGN PATENT DOCUMENTS

| | | |
|---|---|---|
| JP | 2011-064976 A | 3/2011 |
| KR | 10-0629841 B1 | 9/2006 |

(Continued)

*Primary Examiner* — Hoa C Nguyen
*Assistant Examiner* — Christopher L Augustin
(74) *Attorney, Agent, or Firm* — Cantor Colburn LLP

(57) ABSTRACT

A display panel includes a first substrate, a second substrate which faces the first substrate, is smaller than the first substrate so that an edge of the first substrate is exposed in a plan view, a fixing member disposed on the exposed edge of the first substrate, and a bonding member disposed between the first substrate and the fixing member.

9 Claims, 11 Drawing Sheets

(56) References Cited

U.S. PATENT DOCUMENTS

| | | | |
|---|---|---|---|
| 2008/0174945 A1* | 7/2008 | Lee | H05K 5/02 |
| | | | 361/679.01 |
| 2009/0009680 A1* | 1/2009 | Zensai | G02F 1/133308 |
| | | | 349/58 |
| 2009/0153766 A1* | 6/2009 | Lee | H05K 5/02 |
| | | | 349/58 |
| 2009/0207126 A1* | 8/2009 | Arisato | G02F 1/133308 |
| | | | 345/102 |
| 2011/0013112 A1 | 1/2011 | Yaguchi et al. | |
| 2013/0242480 A1* | 9/2013 | Kim | H05K 7/14 |
| | | | 361/679.01 |
| 2014/0063705 A1* | 3/2014 | Song | H04M 1/0266 |
| | | | 361/679.01 |
| 2014/0133073 A1* | 5/2014 | Ahn | H01L 51/5237 |
| | | | 361/679.01 |
| 2015/0234226 A1* | 8/2015 | Ikuta | G02F 1/133308 |
| | | | 348/794 |

FOREIGN PATENT DOCUMENTS

| | | |
|---|---|---|
| KR | 1020080049441 A | 6/2008 |
| KR | 1020080051606 A | 6/2008 |
| KR | 1020120080724 A | 7/2012 |
| KR | 1020130067632 A | 6/2013 |
| KR | 1020130072971 A | 7/2013 |
| KR | 1020130075369 A | 7/2013 |

\* cited by examiner

DISPLAY PANEL AND DISPLAY APPARATUS HAVING THE SAME

This application claims priority under 35 U.S.C. §119 to Korean Patent Application No. 10-2014-0001197, filed on Jan. 6, 2014, and all the benefits accruing therefrom under 35 U.S.C. §119, the contents of which are herein incorporated by reference in their entireties.

BACKGROUND

1. Field

The invention relates to a display panel and a display apparatus having the display panel. More particularly, the invention relates to a display panel used for a display apparatus and a display apparatus having the display panel.

2. Description of the Related Art

Recently, flat panel display apparatuses that can decrease a weight and a volume corresponding to the limitations of Cathode Ray Tubes ("CRTs") are being developed. A Liquid Crystal Display ("LCD"), a Plasma Display panel ("PDP"), a Field Emission Display Device ("FED") and a Light Emitting Display Device are actively being researched as flat type display apparatuses. However, among such flat display apparatuses, the LCD is easily manufactured, has good drivability of drivers, and realizes a high-quality image, thus attracting much attention.

In terms of technology and design interesting to consumers, recently, research and development of flat panel display apparatus are increasingly required. Therefore, efforts are being continuously made for minimizing (e.g., slimming) the thicknesses of a display apparatus, and research is increasingly conducted on a design with enhanced sense of beauty that can induce consumers to buy by appealing to the consumer's sense of beauty.

SUMMARY

In design development for enhancing a sense of beauty or slimming of a display apparatus that have been made to date, elements configuring a related art display apparatus have been applied as is, and structures of the elements have been changed. Due to the above reasons, there are limitations in slimming display apparatus and developing new designs of the display apparatus.

Particularly, a display apparatus using a plane to line switching ("PLS") mode uses a thin panel. Accordingly, a panel of a display apparatus using the PLS mode is easily warped, so that a light leakage may be occurred.

Exemplary embodiments of the invention provide a display panel capable of effectively preventing from a light leakage.

Exemplary embodiments of the invention also provide a display apparatus having the display panel.

In an exemplary embodiment of a display panel according to the invention, the display panel includes a first substrate, a second substrate, a fixing member and a bonding member. The second substrate faces the first substrate. The second substrate is smaller than the first substrate so that an edge of the first substrate is exposed in a plan view. The fixing member is disposed on the exposed edge of the first substrate. The bonding member is disposed between the first substrate and the fixing member.

In an exemplary embodiment, the bonding member may include a double sided tape including rubber.

In an exemplary embodiment, the fixing member may have a frame shape in the plan view and an opening portion may be defined in the fixing member.

In an exemplary embodiment, a portion of the fixing member may have an "L" shape in the plan view.

In an exemplary embodiment, the first substrate and the second substrate may have a rectangular shape. The first substrate may surround the second substrate in the plan view.

In an exemplary embodiment, the fixing member may include a supporting portion and a side wall portion. The supporting portion may face an upper surface of the second substrate. The side wall portion may extend from the supporting portion in a direction crossing a direction to which the supporting portion extends, and face a side surface of the second substrate in a cross sectional view.

In an exemplary embodiment, the fixing member may include a metal.

In an exemplary embodiment, the fixing member may include at least one of polymethyl methacrylate and polycarbonate.

In an exemplary embodiment of a display apparatus according to the invention, the display apparatus includes a display panel, a mold frame and a lower receiving container. The display panel includes a first substrate, a second substrate, a fixing member and a bonding member. The second substrate faces the first substrate. The second substrate is smaller than the first substrate so that an edge of the first substrate is exposed in a plan view. The fixing member is disposed on the exposed edge of the first substrate. The bonding member is disposed between the first substrate and the fixing member. The mold frame is disposed under the display panel to support the display panel. The lower receiving container receives the display panel and the mold frame.

In an exemplary embodiment, the bonding member may include a double sided tape including a rubber.

In an exemplary embodiment, the mold frame may include an outer portion and a bottom portion. The outer portion may surround an edge of the display panel. The bottom portion may extend from the outer portion to an inner direction.

In an exemplary embodiment, the mold frame may further include a locking protrusion provided on an inner side surface of the outer portion. The locking protrusion may be configured to be interlocked with the fixing member.

In an exemplary embodiment, the fixing member may include a supporting portion and a side wall portion. The supporting portion may face an upper surface of the second substrate. The side wall portion may extend from the supporting portion in a direction crossing a direction to which the supporting portion extends, and face a side surface of the second substrate in a cross sectional view.

In an exemplary embodiment, the fixing member may further include a recess provided on an outer side surface of the side wall portion. The locking protrusion may be disposed in the recess.

In an exemplary embodiment, the display apparatus may further include a supporting member disposed between the display panel and the mold frame.

In an exemplary embodiment, the display apparatus may further include a fixing tape adhered to an upper surface of the mold frame and an upper surface of the fixing member.

In an exemplary embodiment, the fixing member may have a frame shape in the plan view, and an opening portion is defined in the fixing member.

In an exemplary embodiment, the first substrate and the second substrate may have a rectangular shape in the plan view. The first substrate may surround the second substrate in the plan view.

In an exemplary embodiment, the fixing member may include a metal.

In an exemplary embodiment, the fixing member may include at least one of polymethyl methacrylate and polycarbonate.

According to the invention as explained above, the fixing member is bonded with the display panel. Thus, warping of the display panel may be effectively prevented.

In addition, warping of the display panel is effectively prevented, so that a quality of a display apparatus may be improved.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
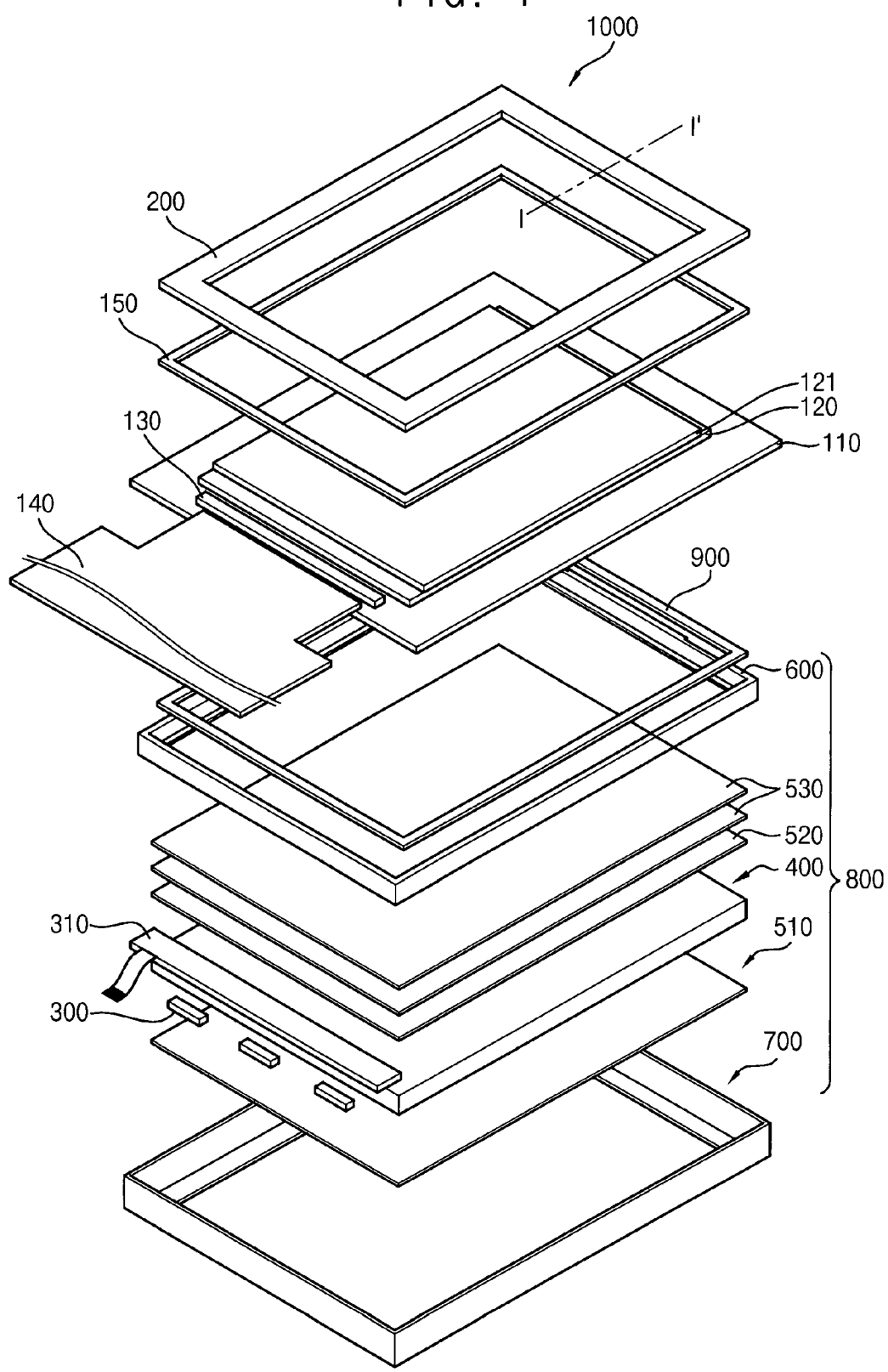
FIG. 1 is an exploded perspective view illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 2:
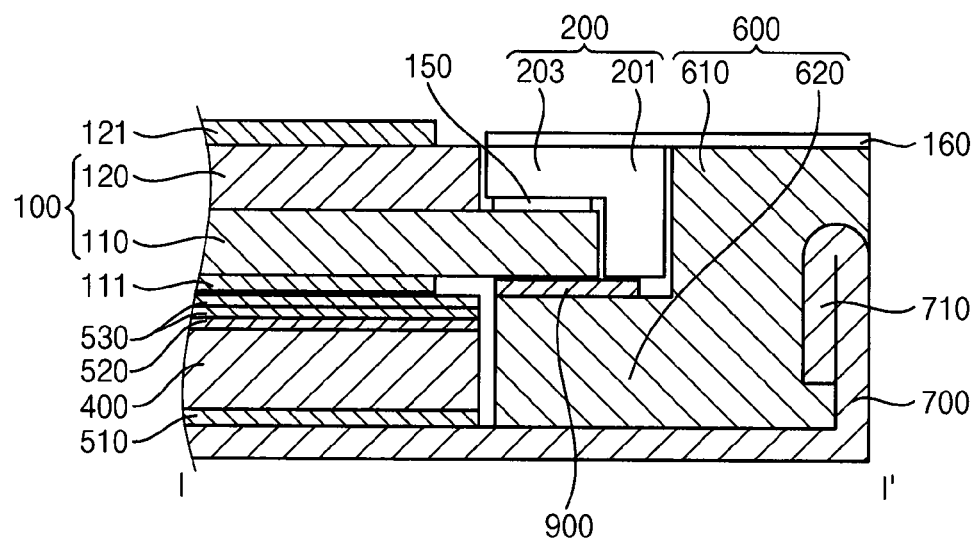
FIG. 2 is a cross-sectional view taken along line I-I' of FIG. 1.

FIG. 1 is an exploded perspective view illustrating an exemplary embodiment of a display apparatus according to the invention. FIG. 2 is a cross-sectional view taken along line I-I' of FIG. 1.

Referring to FIGS. 1 and 2, a display apparatus 1000 according to an exemplary embodiment of the invention includes a display panel 100 displaying an image, a main flexible printed circuit 140 electrically connected to the display panel 100 and a backlight assembly 800 supplying light to the display panel 100.

The display panel 100 includes a first substrate 110, a second substrate 120 facing the first substrate 110, a liquid crystal layer (not shown) disposed between the first substrate 110 and the second substrate 120, a first polarizing film 111 disposed on a lower surface of the first substrate 110, a second polarizing film 121 disposed on an upper surface of the second substrate 120 and a fixing member 200. An image is displayed on the display panel 100 using a light from the backlight assembly 800.

The fixing member 200 may be disposed on the first substrate 110. The fixing member 200 may be bonded with the first substrate 110 by a bonding member 150. In an exemplary embodiment, the bonding member 150 may be a double sided adhesive, such as a tape. In the exemplary embodiment, the bonding member 150 may be a double sided tape including a rubber, for example. In the exemplary embodiment, since the bonding member 150 includes a rubber, the bonding member 150 may absorb an outer pressure. Thus, an outer pressure may not be transferred to the display panel 100, so that a light leakage may be prevented.

The first substrate 110 may include thin film transistors ("TFTs") arranged in a matrix configuration. A source electrode of the TFT is electrically connected to a data line. A gate electrode of the TFT is electrically connected to a gate line. A drain electrode of the TFT is electrically connected to a pixel electrode. The pixel electrode may include a transparent conductive material. In an exemplary embodiment, the pixel electrode may include a transparent conductive material, such as indium tin oxide ("ITO"), indium zinc oxide ("IZO") and etc. In an exemplary embodiment, the pixel electrode may include titanium (Ti) and/or molybdenum titanium (MoTi).

The second substrate 120 faces the first substrate 110. The second substrate 120 may include a color filter realizing a color. The second substrate 120 may include a common electrode. The common electrode may face the pixel electrode. The common electrode may include a transparent conductive material. In an exemplary embodiment, the common electrode may include a transparent conductive material, such as ITO, IZO and etc. In an exemplary embodiment, the common electrode may include titanium (Ti) and/or molybdenum titanium (MoTi).

The second substrate 120 may be smaller than the first substrate 110. Accordingly, when the second substrate 120 is disposed on the first substrate 110, the first substrate 110 may be partially exposed. In an exemplary embodiment, the first substrate 110 and the second substrate 120 may have a rectangular shape, for example, and the first substrate 110 may surround the second substrate 120 in a plan view. However, the invention is not limited thereto, and may first substrate 110 and the second substrate 120 may have various other shapes.

When a power voltage is applied to the gate electrode of the TFT that in turn turns on the TFT, the electric field is generated between the pixel electrode and the common electrode. The electric field varies an aligning angle of the liquid crystal molecules of the liquid crystal layer disposed between the first substrate 110 and the second substrate 120. Thus, a light transmittance of the liquid crystal layer is varied in accordance with the variation of the aligning angle of the liquid crystal, so a desired image may be obtained.

The first polarizing film 111 may be disposed on a lower surface of the first substrate 110. The first polarizing film 111 may have a first polarization axis. The first polarizing film 111 may polarize a light in a first direction. The second polarizing film 121 may be disposed on an upper surface of the second substrate 120. The second polarizing film 121 may have a second polarization axis. The second polarizing film 121 may polarize a light in a second direction crossing the first direction. In an exemplary embodiment, the first polarization axis may be crossed with the second polarization axis, for example.

The display panel 100 may further include a driving chip 130. The driving chip 130 may drive the first substrate 110. The driving chip 130 generates a driving signal driving the first substrate 110 in response to a control signal applied from other elements. In the exemplary embodiment, the driving chip 130 may be disposed at an end of the first substrate 110. In an exemplary embodiment, the driving chip 130 may be electrically connected to the first substrate 110 by a chip-on-glass process, for example.

The main flexible printed circuit 140 is electrically connected to an end of the first substrate 110 to apply a control signal to the display panel 100. In an exemplary embodiment, the main flexible printed circuit 140 may be electrically connected to the first substrate 110 by a chip-on-glass process, for example. In the exemplary embodiment, the main flexible printed circuit 140 is connected to the end of the first substrate 110 and bent to a lower surface of the display panel 100. In an exemplary embodiment, the main flexible printed circuit 140 may include a resin having flexibility, for example.

The backlight assembly 800 is disposed under the display panel 100. The backlight assembly 800 includes a light source unit generating light, a mold frame 600 covering an outside of the light source unit and a lower receiving container 700 receiving the display panel 100 and the mold frame 600.

The light source unit may include a flexible printed circuit board ("PCB") 310, a light source 300, a light guide plate 400 and a plurality of optical sheets.

The flexible PCB 310 may provide the light source 300 disposed thereon with driving power. In the exemplary embodiment, the flexible PCB 310 may be disposed under the first substrate 110 to be adjacent to an end of the display panel 100. In an exemplary embodiment, the flexible PCB 310 may include a resin having flexibility, for example. The flexible PCB 310 may include a metal line disposed thereon.

The light source 300 disposed on the flexible PCB 310 to generate light. In the exemplary embodiment, the light source 300 may be mounted on the flexible PCB 310. In an exemplary embodiment, the light source 300 may include a light emitting diode ("LED") emitting a white light. The number of the light sources 300 may be determined in consideration of size and brightness of the display panel 100. In the exemplary embodiment, the flexible PCB 310 and the light source 300 may be disposed at an end of the light guide plate 400.

The light guide plate 400 may be disposed under the display panel 100. The light guide plate 400 may be provided as a plate shape. The light guide plate 400 may be disposed adjacent to the light source 300 to face a light exit surface of the light source 300. The light guide plate 400 may include a groove (not shown). The light source 300 is inserted into the groove (not shown), so that a loss of a light may be decreased. The light guide plate 400 guides light emitted from the light source 300 toward the display panel 100.

The light guide plate 400 includes a transparent material to minimize a loss of a light from the light source 300. In an exemplary embodiment, the light guide plate 400 may include a material having superior strength, such as polymethylmethacrylate ("PMMA").

In an alternative exemplary, in order to reduce a thickness of the light guide plate 400, the light guide plate 400 may include polycarbonate ("PC"). PC is inferior in strength to PMMA, but is superior in heat-resistance to PMMA.

The optical sheets may improve luminance characteristics of a light emitted from the light guide plate 400. The optical sheets may include a reflecting sheet 510, a diffusion sheet 520 and a prism sheet 530.

The reflecting sheet 510 may be disposed under the light guide plate 400. The reflecting sheet 510 reflects light leaked through a lower surface of the light guide plate 400 back to the light guide plate 400, so that light efficiency is enhanced.

The diffusion sheet 520 may be disposed on the light guide plate 400. The diffusion sheet 520 may diffuse a light exiting from the light guide plate 400.

The prism sheet 530 may be disposed on the diffusion sheet 520. The prism sheet 530 may condense a light exiting from the light guide plate 400. In an exemplary embodiment, the prism sheet 530 may include a vertical prism sheet condensing a light in a vertical direction and a horizontal prism sheet condensing a light in a horizontal direction, for example.

The mold frame 600 may cover an outside of the light source unit to expose a lower surface of the light source unit. The mold frame 600 may be engaged with the display panel 100 disposed above the light source unit. In an exemplary embodiment, the mold frame 600 may be provided as a frame shape. In an exemplary embodiment, the mold frame 600 may be provided with a macromolecule material. In an exemplary embodiment, the mold frame 600 may include a material having superior strength, such as PMMA.

In an alternative exemplary embodiment, in order to reduce a thickness of the mold frame 600, the mold frame 600 may include such as thermoplastic polymers such as PC, for example. PC is inferior in strength to PMMA, but is superior in heat-resistance to PMMA.

The mold frame 600 may include an outer portion 610 and a bottom portion 620. The outer portion 610 may surround an edge of the display panel 100. The bottom portion 620 may extend from the outer portion 610 inwardly. An edge of the display panel 100 may be disposed on the bottom portion 620. A height of the bottom portion 620 measured in a vertical direction in a cross section may be substantially the same as a height of the light source unit. The bottom portion 620 may guide and support the edge of the display panel 100.

The lower receiving container 700 may receive the light source unit. In an exemplary embodiment, the lower receiving container 700 may include a material having superior strength, such as a metal. In an exemplary embodiment, the lower receiving container 700 may be provided as a metal chassis, for example.

The lower receiving container 700 may be successively provided with the mold frame 600. The mold frame 600 may be disposed on the lower receiving container 700 by an insert injection molding process. After the lower receiving container 700 is disposed in a mold manufacturing for the mold frame 600, a mold material is inserted into the mold. Thus, the mold frame 600 may be directly disposed on the lower receiving container 700. When a mold frame and a lower receiving container are respectively manufactured and assembled, a gap between the mold frame and the lower receiving container may be generated. However, the mold frame 600 according to the exemplary embodiment is directly disposed on the lower receiving container 700, so that a gap between the mold frame and the lower receiving container may be minimized.

The lower receiving container 700 may include a securing portion 710. The securing portion 710 may be disposed on the side wall of the lower receiving container 700. The securing portion 710 may enhance a clamping force between the mold frame 600 and the lower receiving container 700.

The securing portion 710 may be extended from the side wall of the lower receiving container 700. The securing portion 710 is bent toward a bottom portion of the lower receiving container 700. In an exemplary embodiment, the securing portion 710 may be provided by hemming, for example. In an exemplary embodiment, the securing portion 710 may have a reversed "U" shape in a cross-sectional view, for example.

The mold frame 600 and the lower receiving container 700 may be successively provided. In an exemplary embodiment, a lower surface of the mold frame 600 may contact with an upper surface of the bottom portion of the lower receiving container 700. An inner surface of the side wall of the lower receiving container 700 may contact with a side surface of the mold frame 600. An upper surface of the wall of the lower receiving container 700 may be covered with the mold frame 600.

The display apparatus 1000 may include a supporting member 900. The supporting member 900 may be disposed on the bottom portion 620 of the mold frame 600 to be overlapped with an edge of the optical sheet. In an exemplary embodiment, the supporting member 900 may have a frame shape, for example. The supporting member 900 may support a lower surface of the display panel 100. In an exemplary embodiment, the supporting member 900 may include a material which does not have adhesive property.

The display apparatus 1000 according to the invention uses a plane to line switching ("PLS") mode. A display panel using a PLS mode may be provided by a substrate having a thickness of 0.5 mm. Thus, a thickness of the fixing member 200 may be less than 0.5 mm.

A fixing tape 160 may be disposed on an upper surface of the fixing member 200 and an upper surface of the mold frame 600. The fixing tape 160 may fix the fixing member 200 on the mold frame 600.

Figure 3:
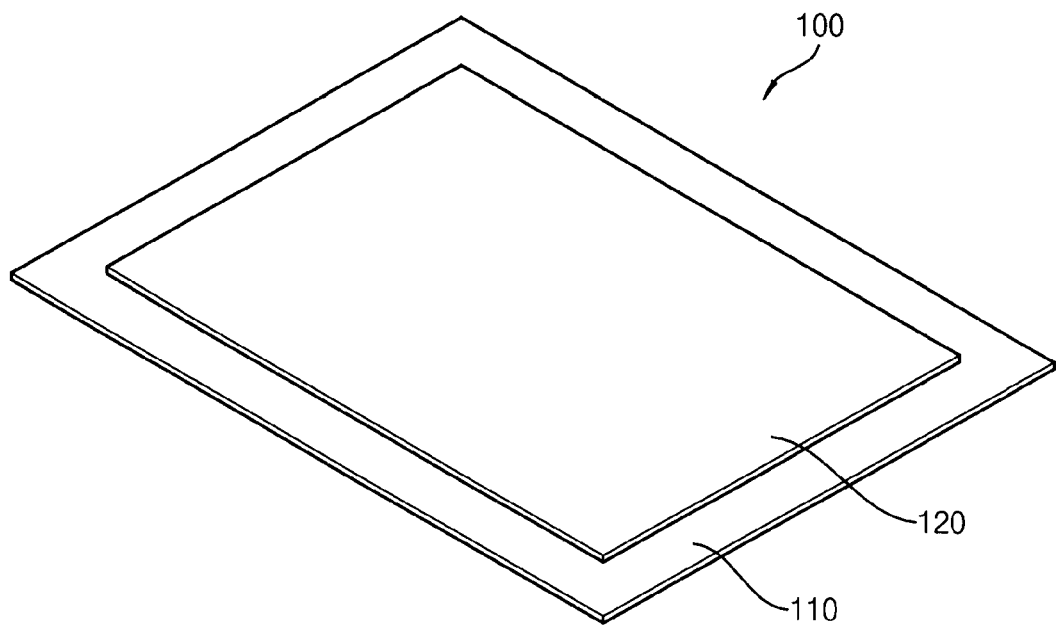
FIG. 3 is a perspective view illustrating an exemplary embodiment of display panel according to the invention.
Figure 4:
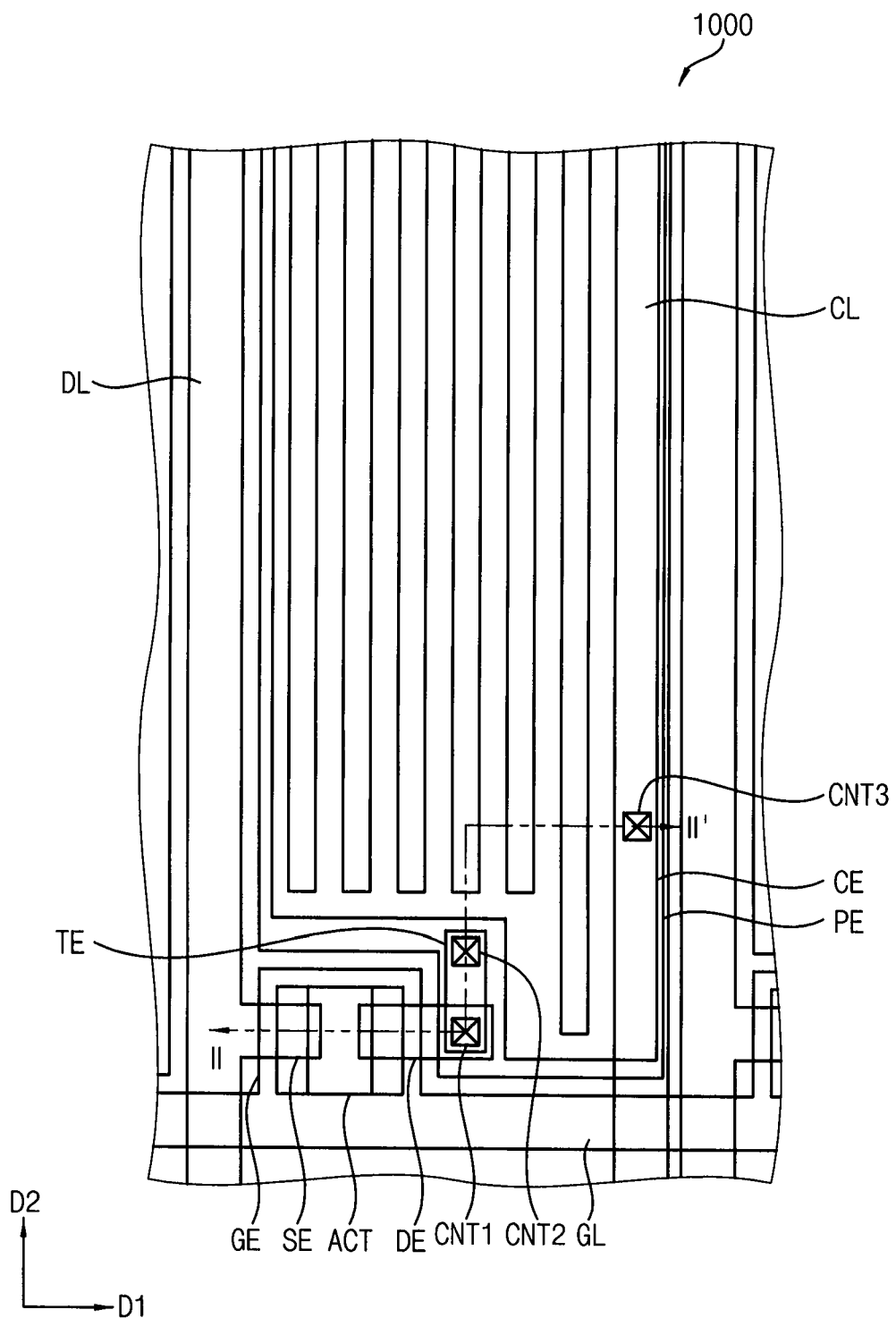
FIG. 4 is a plan view illustrating an exemplary embodiment of a unit pixel of a display panel according to the invention.
Figure 5:
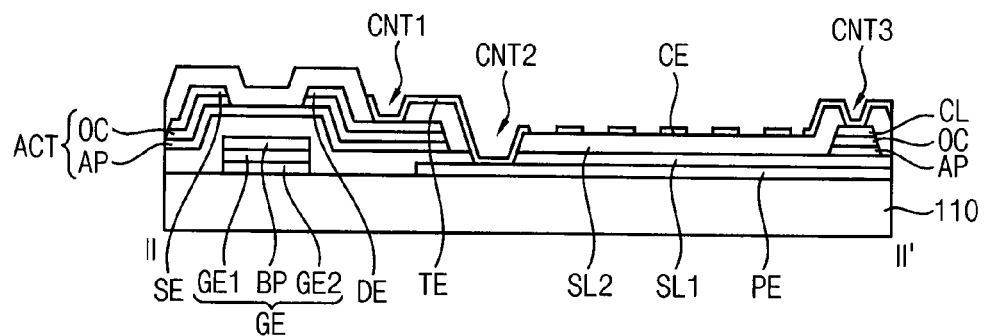
FIG. 5 is a cross-sectional view taken along line II-II' of FIG. 4.

FIG. 3 is a perspective view illustrating an exemplary embodiment of display panel according to the invention. FIG. 4 is a plan view illustrating an exemplary embodiment of a unit pixel of display panel according to the invention. FIG. 5 is a cross-sectional view taken along line II-II' of FIG. 4.

Referring to FIGS. 3 to 5, the display panel 100 according to an exemplary embodiment of the invention includes a first substrate 110, a second substrate 120 facing the first substrate 110 and a liquid crystal layer disposed between the first substrate 110 and the second substrate 120.

In an exemplary embodiment, the first substrate 110 may include a TFTs arranged in a matrix configuration. A source electrode of the TFT may be electrically connected to a data line. A gate electrode of the TFT may be electrically connected to a gate line. A drain electrode of the TFT may be electrically connected to a pixel electrode. In an exemplary embodiment, the pixel electrode may include a transparent conductive material. In an exemplary embodiment, the pixel electrode may include a transparent conductive material, such as ITO, IZO and etc. In addition, the pixel electrode may include titanium (Ti) and/or molybdenum titanium (MoTi), for example.

The second substrate 120 is facing the first substrate 110. In an exemplary embodiment, the second substrate 120 may include a color filter realizing a color. The second substrate 120 may include a common electrode. The common electrode may face the pixel electrode. The common electrode may include a transparent conductive material. In an exemplary embodiment, the common electrode may include a transparent conductive material, such as ITO, IZO and etc. In addition, the common electrode may include titanium (Ti) and/or molybdenum titanium (MoTi).

The second substrate 120 may be smaller than the first substrate 110. Accordingly, when the second substrate 120 is disposed on the first substrate 110, the first substrate 110 may be partially exposed. In an exemplary embodiment, the first substrate 110 and the second substrate 120 may have a rectangular shape, for example, and the first substrate 110 may surround the second substrate 120 in a plan view.

The first substrate 110 may include a gate line GL, a data line DL, a common line CL, a pixel electrode PE, a common electrode CE, a connecting electrode TE, and a switching element. A first contact hole CNT1, a second contact hole CNT2 and a third contact hole CNT3 may be defined in the first substrate 110. The switching element may include a gate electrode GE, a source electrode SE, a drain electrode DE and an active pattern ACT.

The gate line GL extends along a first direction D1. The data line DL extends along a second direction D2 substantially perpendicular to the first direction D1, and crosses the gate line GL.

The gate line GL and the data line DL defines a pixel area. However, the invention is not limited thereto, and a pixel area may not be defined by the gate line GL and the data line DL. Although only one pixel area is generally described in the figures, the display substrate according to the exemplary embodiments generally includes a large number of pixel units respectively provided in respective pixel areas. In an exemplary embodiment, the pixel areas may be arrayed, for example, as a regular matrix structure having a plurality of rows and columns. In an exemplary embodiment, the pixel areas may include same basic and repeated structures so that only one pixel area will be described. However, some variations, for example, in color of color filter portion or size or shape of pixel-electrode may occur. Although the pixel area has a rectangular shape in the figures, the pixel area may have various modifications in size and/or shape and/or number of field altering slits or other fine features included therein. In an exemplary embodiment the pixel areas may have V or Z shapes, for example.

The switching element includes a gate electrode GE, a source electrode SE, a drain electrode DE and the active pattern ACT. The gate electrode GE of the switching element is provided by protruding from the gate line GL in a second direction D2. The gate electrode GE overlaps with the active pattern ACT.

In an exemplary embodiment, the gate electrode GE may have a single layer structure including copper (Cu), silver (Ag), chrome (Cr), molybdenum (Mo), aluminum (Al), titanium (Ti), manganese (Mn) and any combinations thereof. In an exemplary embodiment, the gate electrode GE may have a multi layer structure having a plurality of layers including materials different each other. The gate electrode GE may have an upper layer GE1, a lower layer GE2 and a buffer pattern BP. In an exemplary embodiment, the gate electrode GE may include an upper layer GE1 including titanium, and a lower layer GE2 disposed on the upper layer GE1 and including copper, for example. The buffer pattern BP may be disposed on the lower layer GE2.

The pixel electrode PE is provided in the pixel area. The pixel electrode PE is electrically connected to the drain electrode DE through a connecting electrode TE.

The common electrode CE may be overlapped with the pixel electrode PE. A slit pattern may be defined in the common electrode CE. In the illustrated exemplary embodiment, the slit pattern extends along vertical direction of the pixel area. However, the slit pattern may have various modifications in size and/or shape and/or number of field altering slits or other fine features included therein. In an exemplary embodiment, the slit pattern may have V or Z shapes, for example.

In an exemplary embodiment, the common electrode CE may include a transparent conductive material, such as ITO, IZO and etc. In an exemplary embodiment, the common electrode CE may include titanium (Ti) and/or molybdenum titanium (MoTi). The common electrode CE may be electrically connected with the common line CL. The common electrode CE may be applied with a common voltage from the common line CL. The common electrode CE may be electrically connected with the common line CL through the third contact hole CNT3.

A pixel electrode PE, a first insulation layer SL1, a second insulation layer SL2, a common electrode CE, a gate electrode GE, a source electrode SE, a drain electrode DE, an active pattern ACT, a connecting electrode TE, a common line CL are disposed on the first substrate 110. In an exemplary embodiment, a first contact hole CNT1 and a third contact hole CNT3 may be defined in the first insulation layer SL1, and a second contact hole CNT2 may be defined in the first insulation layer SL1 and the second insulation layer SL2.

In exemplary embodiments, the first substrate 110 may include a glass substrate, a quartz substrate, a silicon substrate, a plastic substrate or the like, for example.

In an exemplary embodiment, the gate electrode GE is disposed on the first substrate 110. The gate electrode GE may have a single layer structure including copper (Cu), silver (Ag), chrome (Cr), molybdenum (Mo), aluminum (Al), titanium (Ti), manganese (Mn) and any combinations thereof. In another exemplary embodiment, the gate electrode GE may have a multi layer structure having a plurality of layers including materials different each other. In the exemplary embodiment, the gate electrode GE may include a lower layer GE2 including titanium, and an upper layer GE1 disposed on the lower layer GE2 and including copper, for example.

The gate electrode GE may include a buffer pattern BP. The buffer pattern BP may be disposed on the upper layer GE1. In an exemplary embodiment, the buffer pattern BP may include an inorganic insulation material, for example. In an exemplary embodiment, the buffer pattern BP may include silicon oxide (SiOx) or silicon nitride (SiNx), for example. The buffer pattern BP is provided on the gate electrode GE to prevent from damage of the gate electrode GE. According to the exemplary embodiments of the invention, a dry etching using plasma is used for providing a polarizer pattern, for example. The gate electrode GE may be damaged in the process of the dry etching. However, since the buffer pattern BP is provided on the gate electrode GE, a damage of the gate electrode GE may be prevented.

The pixel electrode PE is disposed in a pixel region. The pixel electrode PE may be provided in the same layer as the gate electrode GE. The pixel electrode PE may be electrically connected with the drain electrode DE through the connecting electrode TE. In an exemplary embodiment, the pixel electrode PE may be provided as a wire grid polarizer including a polarizer pattern. In an exemplary embodiment, the wire grid polarizer may be provided using a metal material such as aluminum (Al), copper (Cu), titanium (Ti) or molybdenum (Mo). In an exemplary embodiment, the wire grid polarizer may be provided with the same material as that of the lower layer GE2 of the gate electrode GE. In an exemplary embodiment, the lower layer GE2 of the gate electrode GE may be provided using a material including titanium (Ti), for example. In an exemplary embodiment, the wire grid polarizer may be provided using a material including titanium (Ti). Since the wire grid polarizer may function as the pixel electrode PE, high-priced elements such as ITO, IZO or the like may not be required.

The first insulation layer SL1 may cover the base substrate 110, the gate electrode GE and the pixel electrode PE. In an exemplary embodiment, the first insulation layer SL1 may include an inorganic insulation material. In an exemplary embodiment, the first insulation layer SL1 may include silicon oxide (SiOx) or silicon nitride (SiNx), for example. In an exemplary embodiment, the first insulation layer SL1 may include silicon oxide (SiOx) and may have thickness of about 500 angstroms (Å), for example. In an exemplary embodiment, the first insulation layer SL1 may have a multi layer structure having a plurality of layers including materials different each other.

The active pattern ACT may be provided on the first insulation layer SL1. The active pattern ACT may be provided on the first insulation layer SL1 in a region in which the gate electrode GE is provided. The active pattern ACT may be overlapped with the gate electrode GE and partially overlapped with the source electrode SE and the drain electrode DE in a plan view. A portion of the active pattern ACT may be interposed between the gate electrode GE and the source electrode SE. Another portion of the active pattern ACT may be interposed between the gate electrode GE and the drain electrode DE.

The active pattern ACT may include a semiconductor layer AP and an ohmic contact layer OC disposed on the semiconductor layer AP. The semiconductor layer AP may include a silicon semiconductor material. In an exemplary embodiment, the semiconductor layer AP may include amorphous silicon (a-Si:H), for example. The ohmic contact layer OC may be interposed between the gate electrode GE and the source electrode SE, and may be interposed between the gate electrode GE and the drain electrode DE. In an exemplary embodiment, the ohmic contact layer OC may include n+ amorphous silicon (n+ a-Si:H), for example.

The source electrode SE and the drain electrode DE may be disposed on the active pattern ACT. The source electrode SE and the drain electrode DE may be apart from each other.

In an exemplary embodiment, the source electrode SE and the drain electrode DE may have a single layer structure including copper (Cu), silver (Ag), chrome (Cr), molybdenum (Mo), aluminum (Al), titanium (Ti), manganese (Mn) and any combinations thereof. In another exemplary embodiment, the gate line GL may have a multi layer structure having a plurality of layers including materials different each other. In an exemplary embodiment, the source electrode SE and the drain electrode DE may include a copper layer and a titanium layer disposed on and/or under the copper layer, for example.

The second insulation layer SL2 may be provided to cover the source electrode SE, the drain electrode DE and the common line CL. The first contact hole CNT1, the second contact hole CNT2 and the third contact hole CNT3 may be defined in The second insulation layer SL2. The first contact hole CNT1 may expose a portion of the drain electrode DE. The second contact hole CNT2 may expose a portion of the pixel electrode PE. The third contact hole CNT3 may expose a portion of the common line CL. In an exemplary embodiment, the second insulation layer SL2 may be provided with a material including silicon oxide (SiOx) or silicon nitride (SiNx), for example.

The connecting electrode TE and the common electrode CE may be disposed on the second insulation layer SL2.

The connecting electrode TE connects the drain electrode DE and the pixel electrode PE through the first contact hole CNT1 and the second contact hole CNT2.

The common electrode CE may be overlapped with the pixel electrode PE. A slit pattern may be defined in the common electrode CE. In an illustrated exemplary embodiment, the slit pattern extends along vertical direction of the pixel area. However, the invention is not limited thereto, and the slit pattern may have various modifications in size and/or shape and/or number of field altering slits or other fine features included therein. In an exemplary embodiment, the slit pattern may have V or Z shapes, for example.

In an exemplary embodiment, the common electrode CE may include a transparent conductive material, such as ITO, IZO and etc. In an exemplary embodiment, the common electrode CE may include titanium (Ti) and/or molybdenum titanium (MoTi). The common electrode CE may be electrically connected with the common line CL. The common electrode CE may be applied with a common voltage from the common line CL. The common electrode CE may be electrically connected with the common line CL through the third contact hole CNT3.

In an exemplary embodiment, the display apparatus according to the invention uses a PLS mode, for example. A display panel of the PLS mode provides a pixel electrode and a common electrode overlapped with the pixel electrode. An electric field applied between the pixel electrode and the common electrode spins liquid crystal molecules, to represent a gray scale. A display panel using a PLS mode may be provided by a substrate having a thickness of about 0.5 millimeters ("mm").

Figure 6:
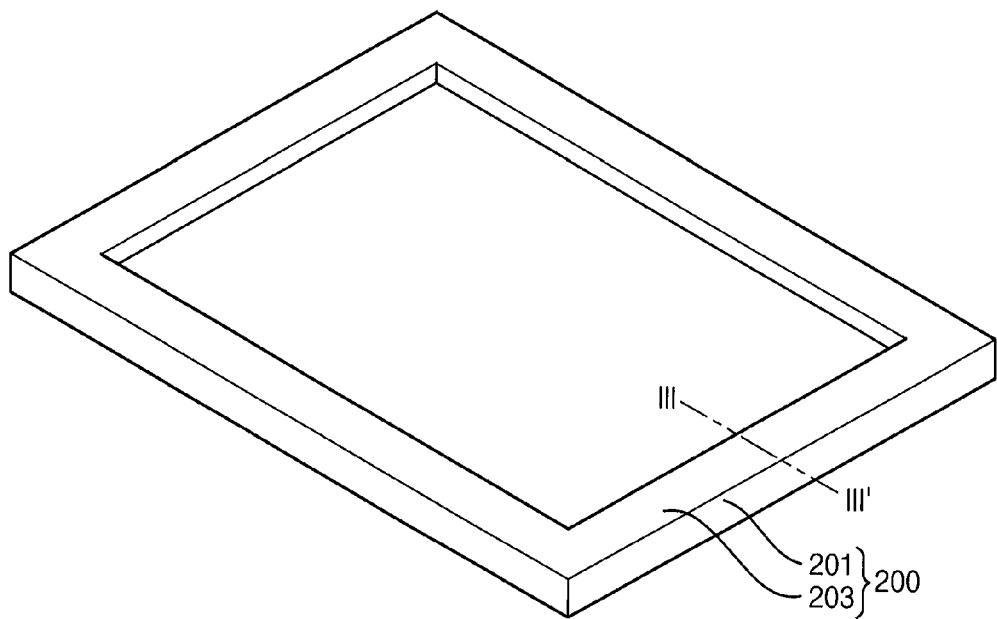
FIG. 6 is a perspective view illustrating an exemplary embodiment of a fixing member according to the invention.
Figure 7:
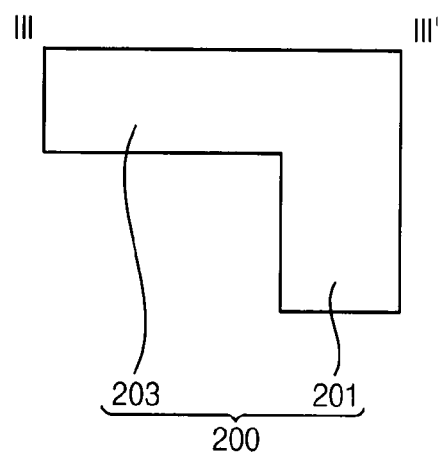
FIG. 7 is a cross-sectional view taken along line III-III' of FIG. 6.

FIG. 6 is a perspective view illustrating a fixing member of an exemplary embodiment according to the invention. FIG. 7 is a cross-sectional view taken along line III-III' of FIG. 6.

Referring to FIGS. 6 and 7, an opening portion may be defined in a fixing member 200 according to the invention.

The fixing member 200 includes a side wall portion 201 and a supporting portion 203. The side wall portion 201 surrounds an edge of the display panel 100 according to the invention. The supporting portion 203 is extended from the side wall portion 201 to an inner direction. The supporting portion 203 may be bonded with the display panel 100 according to the invention.

Since the fixing member 200 is bonded with the display panel 100, the fixing member 200 may prevent warping of the display panel 100. Thus, the fixing member 200 may be provided by hard material capable of fixing the display panel 100. In an exemplary embodiment, the fixing member 200 may include a metal, for example. In an exemplary embodiment, the fixing member 200 may include at least one of polymethyl methacrylate and PC, for example.

Figure 8:
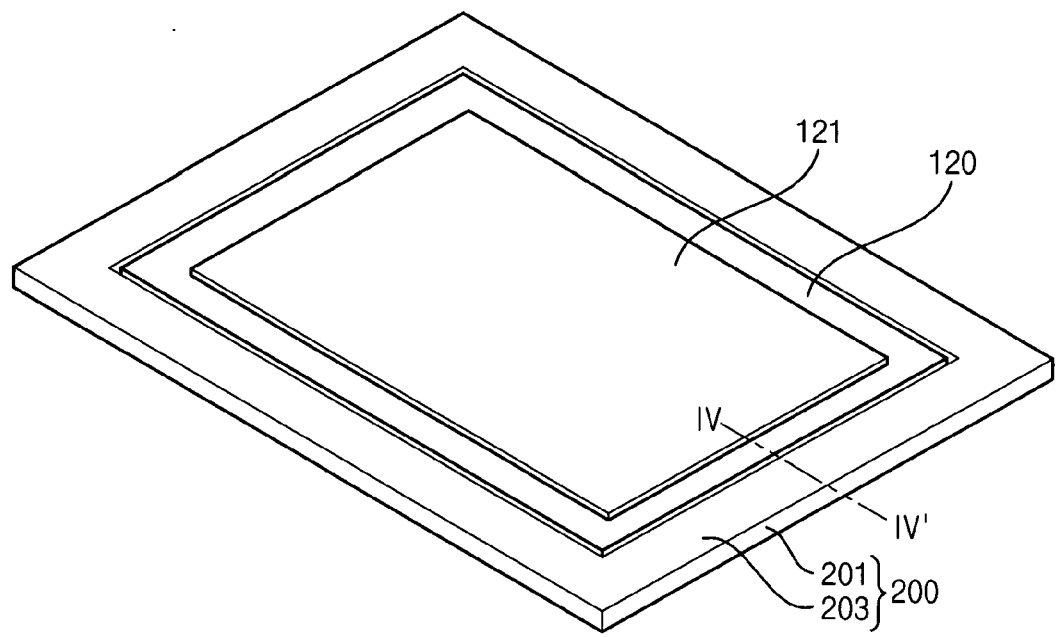
FIG. 8 is a perspective view illustrating an exemplary embodiment of display panel bonded with a fixing member according to the invention.
Figure 9:
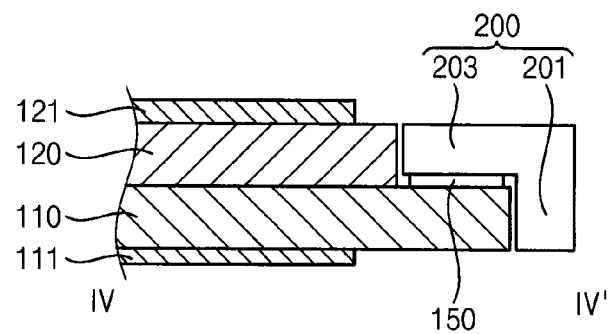
FIG. 9 is a cross-sectional view taken along line IV-IV' of FIG. 8.

FIG. 8 is a perspective view illustrating an exemplary embodiment of display panel bonded with a fixing member according to the invention. FIG. 9 is a cross-sectional view taken along line IV-IV' of FIG. 8.

Referring to FIGS. 8 and 9, a fixing member 200 according to the invention is engaged with the first substrate 110 and the second substrate 120.

The second substrate 120 may be smaller than the first substrate 110. Accordingly, when the second substrate 120 is disposed on the first substrate 110, the first substrate 110 may be partially exposed. In an exemplary embodiment, the first substrate 110 and the second substrate 120 may have a thickness of 0.5 mm, for example.

The first polarizing film 111 may be disposed on a lower surface of the first substrate 110. In an exemplary embodiment, the first polarizing film 111 may have a first polarization axis. The first polarizing film 111 may polarize a light in a first direction. The second polarizing film 121 may be disposed on an upper surface of the second substrate 120. The second polarizing film 121 may have a second polarization axis. In an exemplary embodiment, the second polarizing film 121 may polarize a light in a second direction crossing the first direction. In an exemplary embodiment, the first polarization axis may be crossed with the second polarization axis.

The fixing member 200 is bonded on the exposed edge of the first substrate 110. The fixing member 200 may be bonded with the first substrate 110 by a bonding member 150. In an exemplary embodiment, a thickness of the fixing member 200 may be less than 0.5 mm. In an exemplary embodiment, the bonding member 150 may be a double sided adhesive such as a tape. In an exemplary embodiment, the bonding member 150 may be a double sided tape including a rubber, for example. In the exemplary embodiment, since the bonding member 150 includes a rubber, the bonding member 150 may absorb an outer pressure. Thus, an outer pressure may not be transferred to the display panel 100, so that a light leakage may be prevented.

Figure 10:
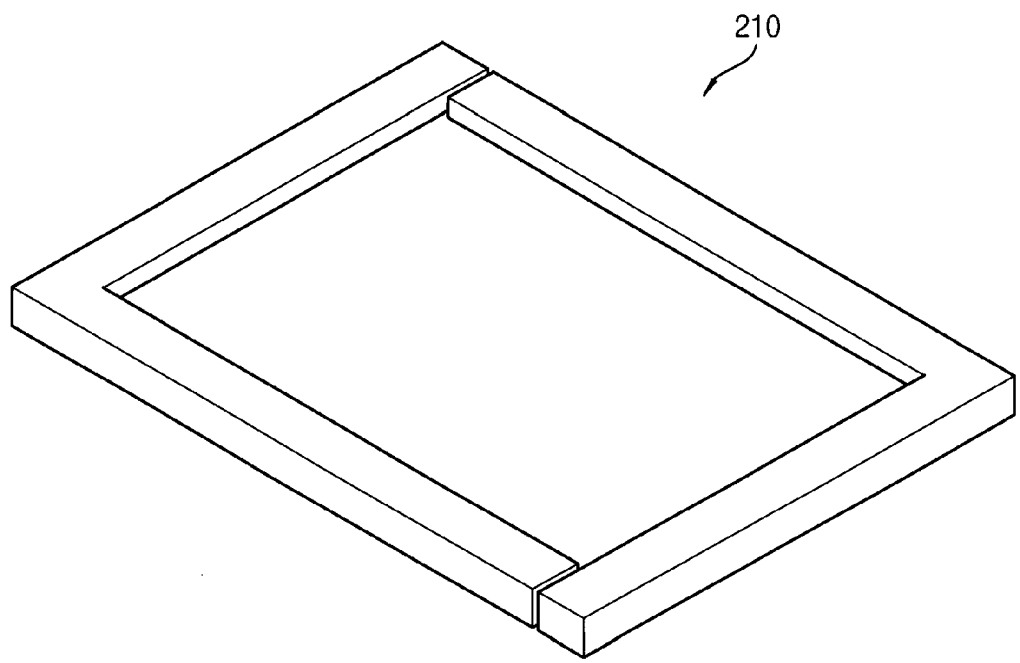
FIG. 10 is a perspective view illustrating an exemplary embodiment a fixing member according to the invention.

FIG. 10 is a perspective view illustrating a fixing member of an exemplary embodiment according to the invention.

Referring to FIG. 10, a portion of a fixing member 210 according to the invention may have an "L" shape in a plan view.

Since the fixing member 210 is bonded with the display panel 100, the fixing member 210 may prevent warping of the display panel 100. Thus, the fixing member 210 may be provided by hard material capable of fixing the display panel 100. In an exemplary embodiment, the fixing member 210 may include a metal. In an exemplary embodiment, fixing member 210 may include at least one of polymethyl methacrylate and PC, for example.

Figure 11:
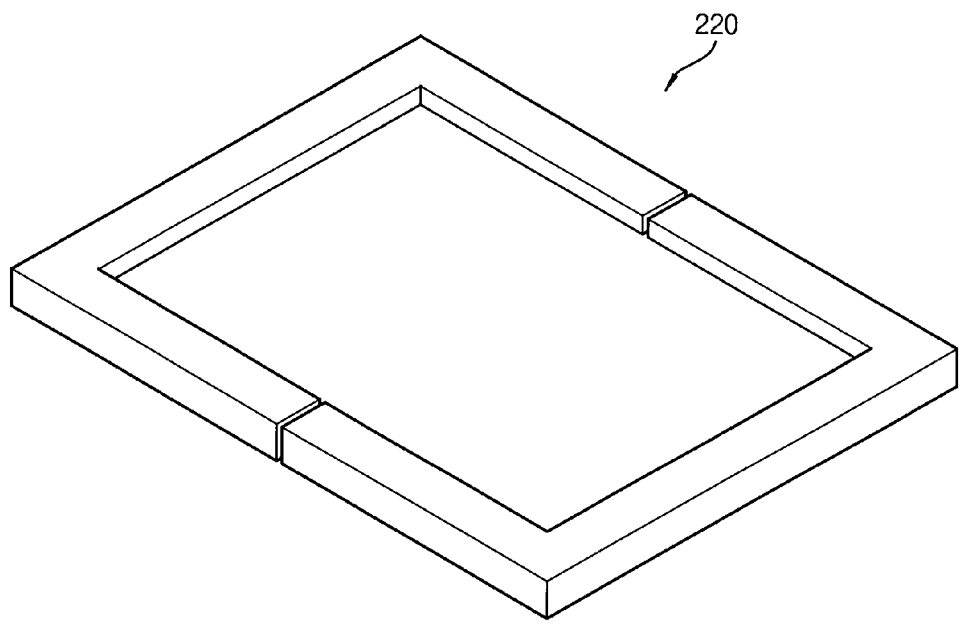
FIG. 11 is a perspective view illustrating an exemplary embodiment of a fixing member according to the invention.

FIG. 11 is a perspective view illustrating a fixing member of an exemplary embodiment according to the invention.

Referring to FIG. 11, a portion of a fixing member 220 according to the invention may have a "U" shape in a plan view.

Since the fixing member 220 is bonded with the display panel 100, the fixing member 220 may prevent warping of the display panel 100. Thus, the fixing member 220 may be provided by hard material capable of fixing the display panel 100. In an exemplary embodiment, the fixing member 220 may include a metal. In an exemplary embodiment, the fixing member 220 may include at least one of polymethyl methacrylate and PC, for example.

Figure 12:
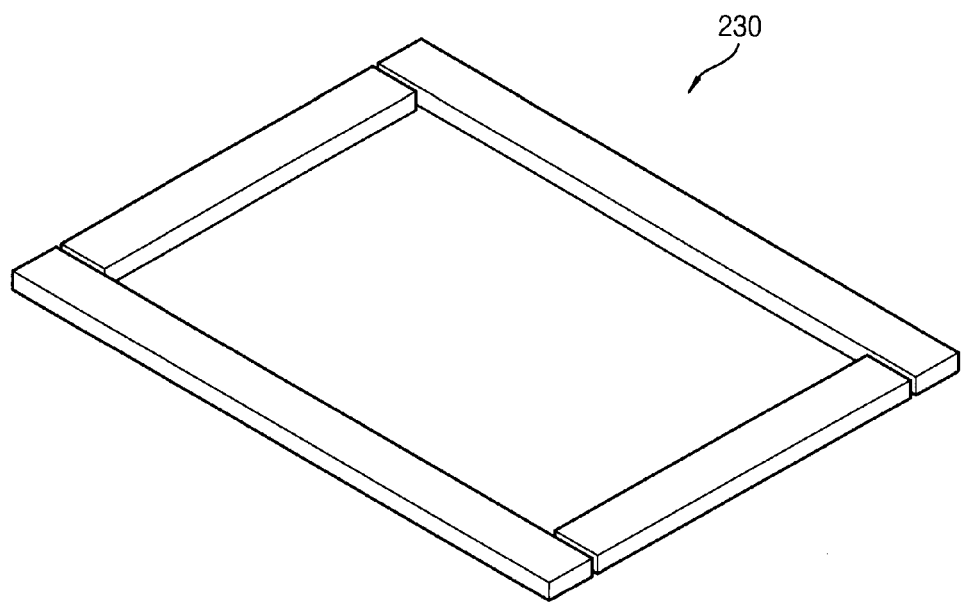
FIG. 12 is a perspective view illustrating an exemplary embodiment of a fixing member according to the invention.

FIG. 12 is a perspective view illustrating a fixing member of an exemplary embodiment according to the invention.

Referring to FIG. 12, a portion of a fixing member 230 according to the invention may have an "I" shape in a plan view.

Since the fixing member 230 is bonded with the display panel 100, the fixing member 230 may prevent warping of the display panel 100. Thus, the fixing member 230 may be provided by a hard material capable of fixing the display panel 100. In an exemplary embodiment, the fixing member 230 may include a metal. In an exemplary embodiment, the fixing member 230 may include at least one of polymethyl methacrylate and PC, for example.

Figure 13:
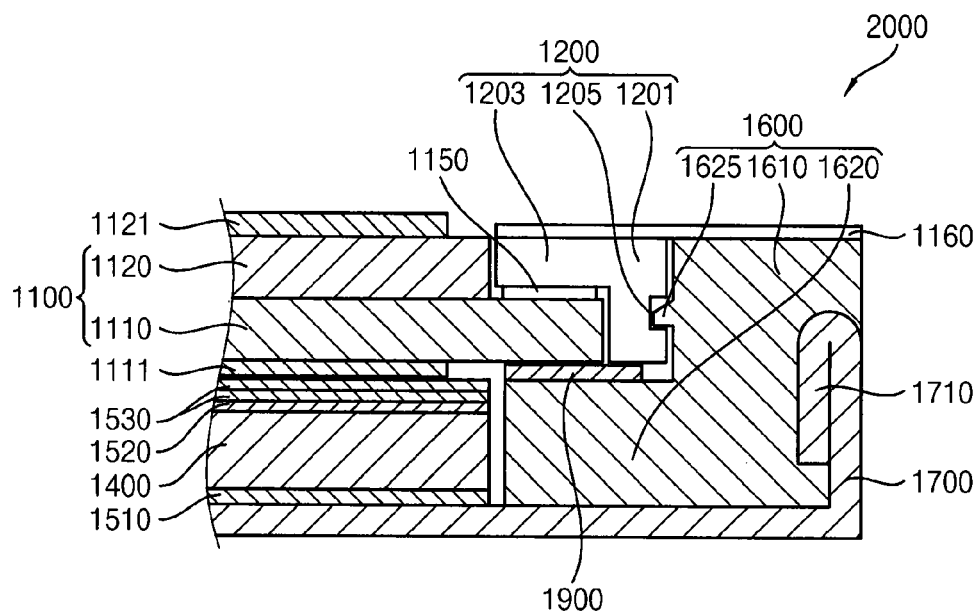
FIG. 13 is a cross-sectional view illustrating an exemplary embodiment of a display apparatus according to the invention.

FIG. 13 is a cross-sectional view illustrating an exemplary embodiment of a display apparatus according to the invention.

Referring to FIG. 13, a display apparatus according to the invention includes a display panel 1100 displaying an image, a light guide plate 1400, a mold frame 1600 supporting the display panel 1100 and a lower receiving container 1700 receiving the display panel 1100, the light guide plate 1400 and the mold frame 1600. The display panel 1100 may include a first substrate 1110 and a second substrate 1120.

The mold frame 1600 may include an outer portion 1610 and a bottom portion 1620. The outer portion 1610 may surround an edge of the display panel 1100. The bottom portion 1620 may extend from the outer portion 1610 inwardly. An edge of the display panel 1100 may be disposed on the bottom portion 1620. A height of the bottom portion 1620 may be substantially the same as a height of a light source unit. The bottom portion 1620 may guide and support the edge of the display panel 1100.

A locking protrusion 1625 is provided on an inner side surface of the outer portion 1610. The locking protrusion 1625 may be inserted into a recess 1205 defined in the fixing member 1200. In the present exemplary embodiment, the locking protrusion 1625 is inserted into the recess 1205, so that the fixing member 1200 may be effectively fixed to the mold frame 1600.

The lower receiving container 1700 may receive the light source unit. In an exemplary embodiment, the lower receiving container 1700 may include a material having superior strength, such as a metal. In an exemplary embodiment, the lower receiving container 1700 may be provided as a metal chassis, for example.

In an exemplary embodiment, the lower receiving container 1700 may be successively provided with the mold frame 1600. In an exemplary embodiment, the mold frame 1600 may be disposed on the lower receiving container 1700 by an insert injection molding process, for example. After the lower receiving container 1700 is disposed in a mold manufacturing for the mold frame 1600, a mold material is inserted into the mold. Thus, the mold frame 1600 may be directly disposed on the lower receiving container 1700. When a mold frame and a lower receiving container are manufactured respectively, a gap between the mold frame and the lower receiving container may be generated. However, in the exemplary embodiment, the mold frame 1600 according to the exemplary embodiment is directly disposed on the lower receiving container 1700, so that a gap between the mold frame and the lower receiving container may be minimized.

The lower receiving container 1700 may include a securing portion 1710. The securing portion 1710 may be disposed on the side wall of the lower receiving container 1700. In an exemplary embodiment, the securing portion 1710 may enhance a clamping force between the mold frame 1600 and the lower receiving container 1700.

The securing portion 1710 may be extended from the side wall of the lower receiving container 1700. The securing portion 1710 is bent toward a bottom portion of the lower receiving container 1700. In an exemplary embodiment, the securing portion 1710 may be provided by hemming, for example. In an exemplary embodiment, the securing portion 1710 may have a "U" shape in a cross-sectional view.

The mold frame 1600 and the lower receiving container 1700 may be successively provided. In an exemplary embodiment, a lower surface of the mold frame 1600 may contact with an upper surface of the bottom portion of the lower receiving container 1700. An inner surface of the side wall of the lower receiving container 1700 may contact with a side surface of the mold frame 1600. An upper surface of the wall of the lower receiving container 1700 may be covered with the mold frame 1600.

The display apparatus 2000 may include a supporting member 1900. The supporting member 1900 may be disposed on the bottom portion 1620 of the mold frame 1600 to be overlapped with an edge of the optical sheet. The supporting member 1900 may have a frame shape. The supporting member 1900 may support a lower surface of the display panel 1100. In an exemplary embodiment, the supporting member 1900 may include a material not including adhesive property.

The fixing member 1200 may be disposed on the first substrate 1110. The bonding member 1150 is disposed between the fixing member 1200 and the first substrate 1110. In an exemplary embodiment, the bonding member 1150 may be a double sided tape. In addition, the bonding member 1150 may be a double sided tape including a rubber. The bonding member 1150 includes a rubber, so that bonding member 1150 may absorb an outer pressure. Thus, an outer pressure may not be transferred to the display panel 1100, so that a light leakage may be prevented.

The fixing member 1200 includes a side wall portion 1201 and a supporting portion 1203. The side wall portion 1201 surrounds an edge of the display panel 1100 according to the invention. The supporting portion 1203 is extended from the side wall portion 1201 to an inner direction.

In an exemplary embodiment, the display apparatus 2000 according to the invention uses a PLS mode, for example. A display panel using a PLS mode may be provided by a substrate having a thickness of about 0.5 mm. Thus, a thickness of the fixing member 1200 may be less than about 0.5 mm.

A fixing tape 1160 may be disposed on an upper surface of the fixing member 1200 and an upper surface of the mold frame 1600. The fixing tape 1160 may fix the fixing member 1200 on the mold frame 1600.

The reflecting sheet 1510 may be disposed under the light guide plate 1400. The reflecting sheet 1510 reflects light leaked through a lower surface of the light guide plate 1400 back to the light guide plate 1400, so that light efficiency is enhanced.

The diffusion sheet 1520 may be disposed on the light guide plate 1400. The diffusion sheet 1520 may diffuse a light exiting from the light guide plate 1400.

The prism sheet 1530 may be disposed on the diffusion sheet 1520. The prism sheet 1530 may condense a light exiting from the light guide plate 1400. In an exemplary embodiment, the prism sheet 1530 may include a vertical prism sheet condensing a light in a vertical direction and a horizontal prism sheet condensing a light in a horizontal direction, for example.

Figure 14:
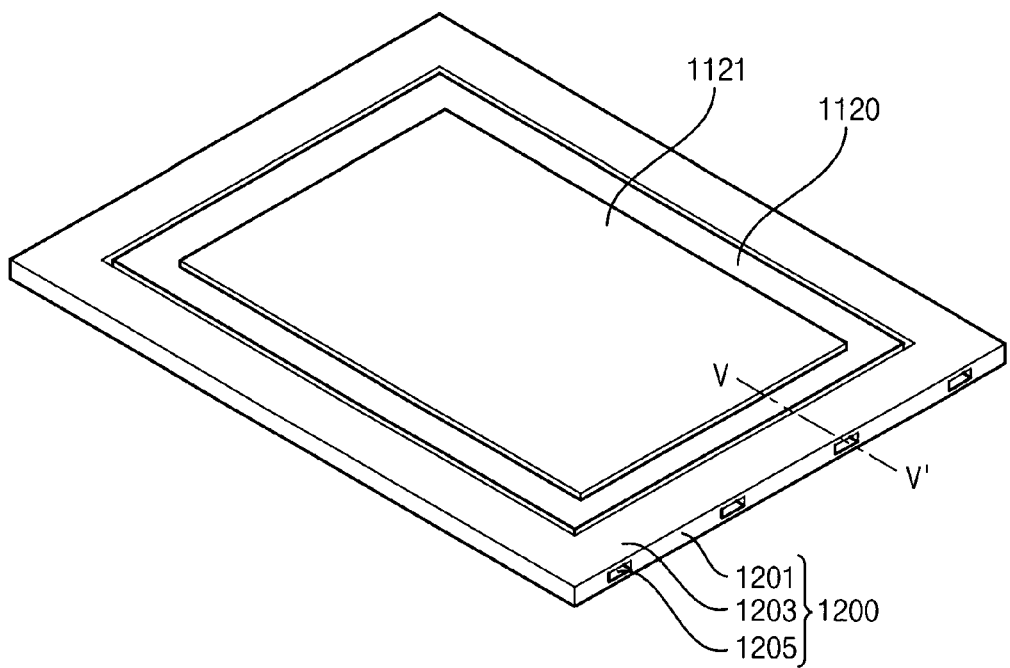
FIG. 14 is a perspective view illustrating an exemplary embodiment of display panel bonded with a fixing member according to the invention.
Figure 15:
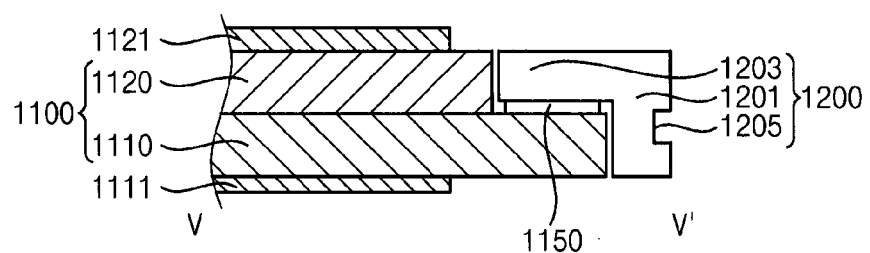
FIG. 15 is a cross-sectional view taken along line V-V' of FIG. 14.

FIG. 14 is a perspective view illustrating an exemplary embodiment of display panel bonded with a fixing member according to the invention. FIG. 15 is a cross-sectional view taken along line V-V' of FIG. 14.

Referring to FIGS. 14 and 15, a fixing member 1200 according to the invention is engaged with the first substrate 1110 and the second substrate 1120.

The second substrate 1120 may be smaller than the first substrate 1110. Accordingly, when the second substrate 1120 is disposed on the first substrate 1110, the first substrate 1110 may be partially exposed. In an exemplary embodiment, the first substrate 1110 and the second substrate 1120 may have a thickness of 0.5 mm, for example.

The first polarizing film 1111 may be disposed on a lower surface of the first substrate 1110. The first polarizing film 1111 may have a first polarization axis. In an exemplary embodiment, the first polarizing film 1111 may polarize a light in a first direction. The second polarizing film 1121 may be disposed on an upper surface of the second substrate 1120. The second polarizing film 1121 may have a second polarization axis. In an exemplary embodiment, the second polarizing film 1121 may polarize a light in a second direction crossing the first direction. In an exemplary embodiment, the first polarization axis may be crossed with the second polarization axis.

The fixing member 1200 is bonded on the exposed edge of the first substrate 1110. The fixing member 1200 includes a side wall portion 1201 and a supporting portion 1203. The side wall portion 1201 surrounds an edge of the display panel 1100 according to the invention. The supporting portion 1203 is extended from the side wall portion 1201 to an inner direction. A recess 1205 is provided on an outer surface of the side wall portion 1201. The locking protrusion 1625 may be inserted into the recess 1205.

The fixing member 1200 may be bonded with the first substrate 1110 by a bonding member 1150. In an exemplary embodiment, a thickness of the fixing member 1200 may be less than 0.5 mm, for example. In an exemplary embodiment, the bonding member 1150 may be a double sided adhesive. In the exemplary embodiment, the bonding member 1150 may be a double sided tape including a rubber. Since the bonding member 1150 includes a rubber, the bonding member 1150 may absorb an outer pressure. Thus, an outer pressure may not be transferred to the display panel 1100, so that a light leakage may be prevented.

Figure 16:
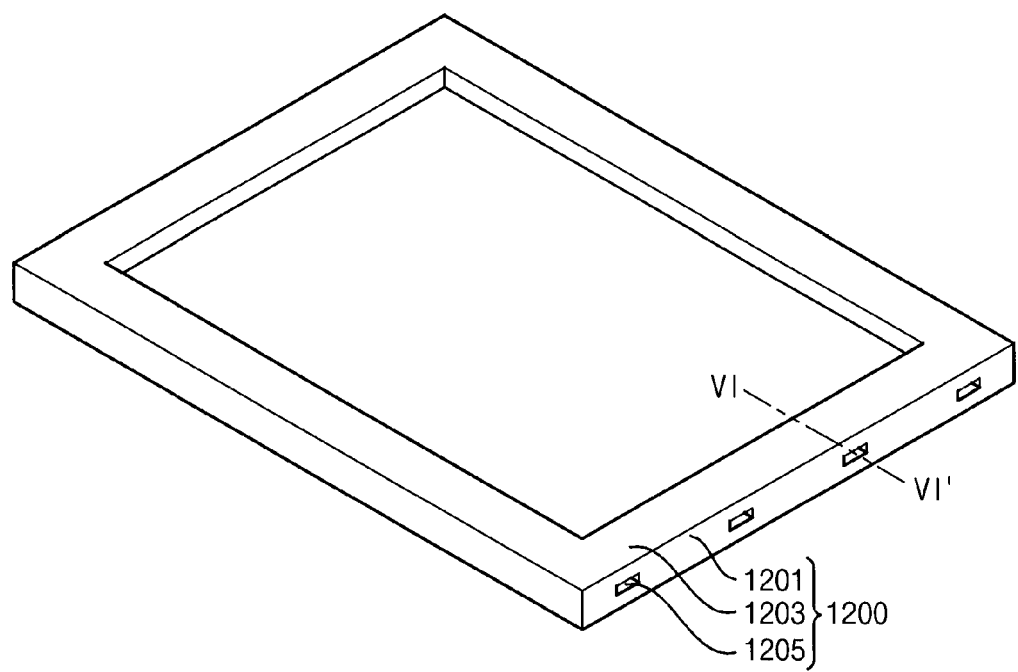
FIG. 16 is a perspective view illustrating an exemplary embodiment of a fixing member according to the invention.
Figure 17:
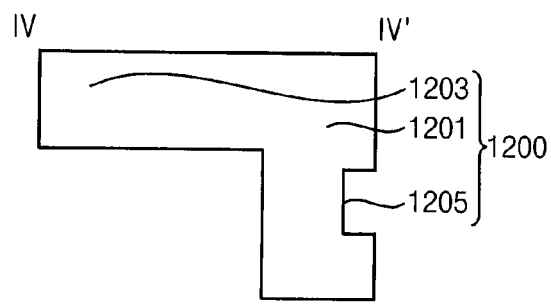
FIG. 17 is a cross-sectional view taken along line VI-VI' of FIG. 16.

FIG. 16 is a perspective view illustrating a fixing member of an exemplary embodiment according to the invention. FIG. 17 is a cross-sectional view taken along line VI-VI' of FIG. 16.

Referring to FIGS. 16 and 17, an opening portion is defined in a fixing member 1200.

The fixing member 1200 includes a side wall portion 1201 and a supporting portion 1203. The side wall portion 1201 surrounds an edge of the display panel 1100 according to the invention. The supporting portion 1203 is extended from the side wall portion 1201 to an inner direction. The supporting portion 1203 may be bonded with the display panel 1100 according to the invention. A recess 1205 is provided on an outer surface of the side wall portion 1201. The locking protrusion 1625 may be inserted into the recess 1205.

The fixing member 1200 is bonded with the display panel 1100, the fixing member 1200 may prevent warping of the display panel 1100. Thus, the fixing member 1200 may be provided by hard material capable of fixing the display panel 1100. In an exemplary embodiment, the fixing member 1200 may include a metal. In addition, the fixing member 1200 may include at least one of polymethyl methacrylate and PC.

Figure 18:
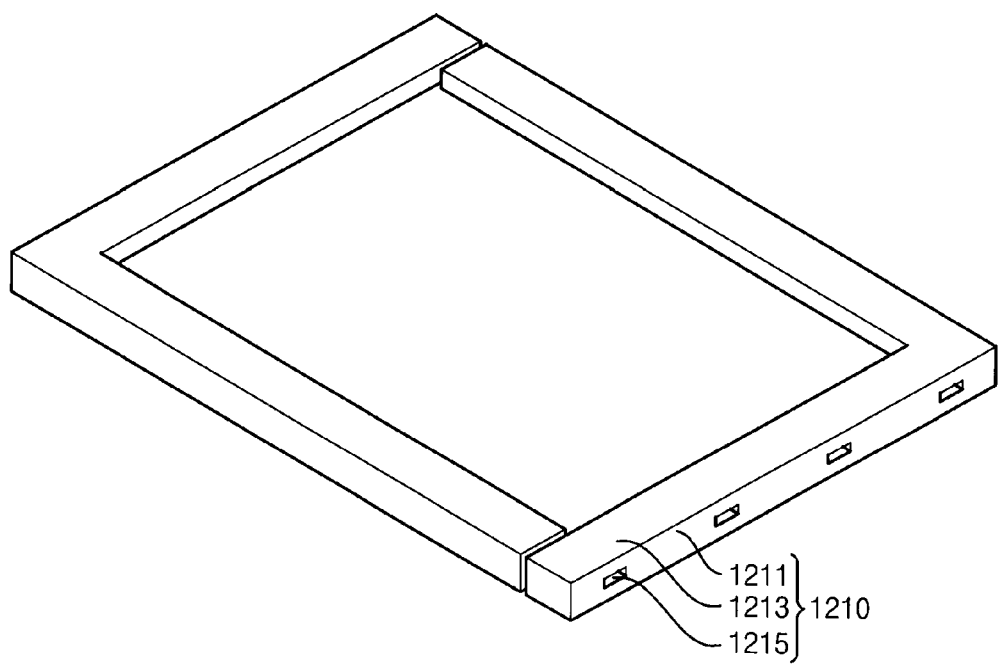
FIG. 18 is a perspective view illustrating an exemplary embodiment of a fixing member according to the invention.

FIG. 18 is a perspective view illustrating a fixing member of an exemplary embodiment according to the invention.

Referring to FIG. 18, a portion of a fixing member 1210 according to the invention may have an "L" shape in a plan view.

The fixing member 1210 includes a side wall portion 1211 and a supporting portion 1213. The side wall portion 1211 surrounds an edge of the display panel 1100 according to the invention. The supporting portion 1213 is extended from the side wall portion 1211 to an inner direction. The supporting portion 1213 may be bonded with the display panel 1100 according to the invention. A recess 1215 is defined in an outer surface of the side wall portion 1211. The locking protrusion 1625 may be inserted into the recess 1215.

Since the fixing member 1210 is bonded with the display panel 1100, the fixing member 1210 may prevent warping of the display panel 1100. Thus, the fixing member 1210 may be provided by hard material capable of fixing the display panel 1100. In an exemplary embodiment, the fixing member 1210 may include a metal, for example. In an exemplary embodiment, the fixing member 1210 may include at least one of polymethyl methacrylate and PC, for example.

Figure 19:
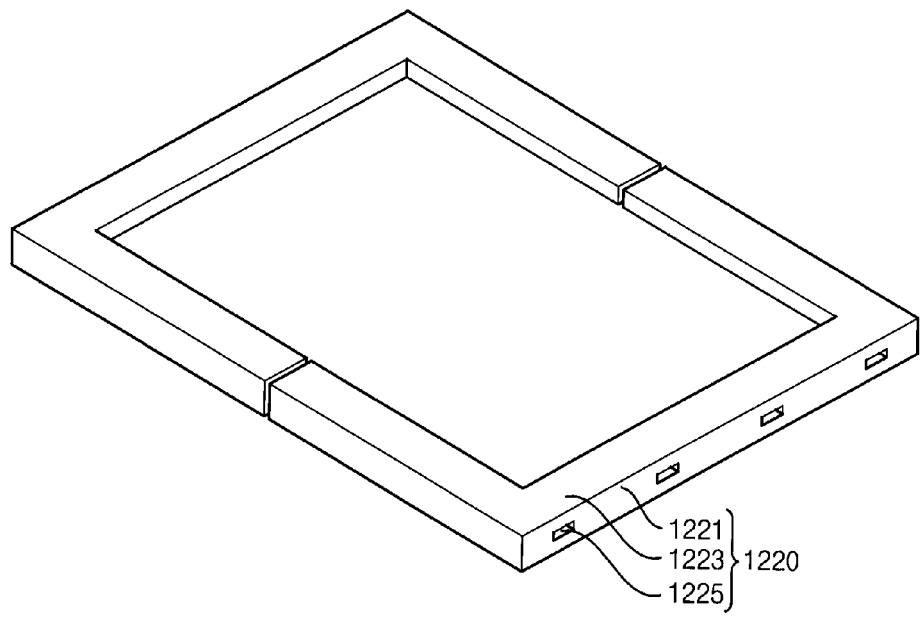
FIG. 19 is a perspective view illustrating an exemplary embodiment a fixing member according to the invention.

FIG. 19 is a perspective view illustrating a fixing of an exemplary embodiment member according to the invention.

Referring to FIG. 19, a portion of a fixing member 1220 according to the invention may have a "U" shape in a plan view.

The fixing member 1220 includes a side wall portion 1221 and a supporting portion 1223. The side wall portion 1221 surrounds an edge of the display panel 1100 according to the invention. The supporting portion 1223 is extended from the side wall portion 1221 to an inner direction. The supporting portion 1223 may be bonded with the display panel 1100 according to the invention. A recess 1225 is defined in an outer surface of the side wall portion 1221. The locking protrusion 1625 may be inserted into the recess 1225.

Since the fixing member 1220 is bonded with the display panel 1100, the fixing member 1220 may prevent warping of the display panel 1100. Thus, the fixing member 1220 may be provided by hard material capable of fixing the display panel 1100. In an exemplary embodiment, the fixing member 1220 may include a metal, for example. In an exemplary embodiment, the fixing member 1220 may include at least one of polymethyl methacrylate and PC, for example.

Figure 20:
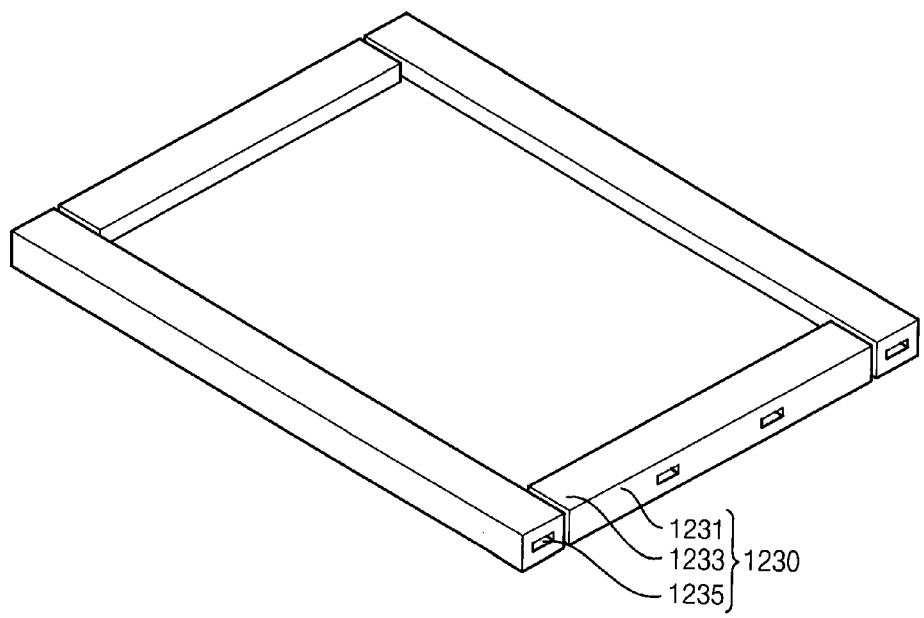
FIG. 20 is a perspective view illustrating an exemplary embodiment of a fixing member according to the invention.

FIG. 20 is a perspective view illustrating a fixing member of an exemplary embodiment according to the invention.

Referring to FIG. 20, a fixing member 1230 according to the invention may have an "I" shape in a plan view.

The fixing member 1230 includes a side wall portion 1231 and a supporting portion 1233. The side wall portion 1231 surrounds an edge of the display panel 1100 according to the invention. The supporting portion 1233 is extended from the side wall portion 1231 to an inner direction. The supporting portion 1233 may be bonded with the display panel 1100 according to the invention. A recess 1235 is defined in an outer surface of the side wall portion 1231. The locking protrusion 1625 may be inserted into the recess 1235.

Since the fixing member 1230 is bonded with the display panel 1100, the fixing member 1230 may prevent warping of the display panel 1100. Thus, the fixing member 1230 may be provided by hard material capable of fixing the display panel 1100. In an exemplary embodiment, the fixing member 1230 may include a metal. In addition, the fixing member 1230 may include at least one of polymethyl methacrylate and PC.

According to the invention as explained above, the fixing member is bonded with the display panel. Thus, warping of the display panel may be prevented.

In addition, warping of the display panel is prevented, so that a quality of a display apparatus may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
  a display panel including:
    a first substrate,
    a second substrate which faces the first substrate and is smaller than the first substrate so that an edge of the first substrate is exposed in a plan view,
    a fixing member disposed on the exposed edge of the first substrate; and
    a bonding member disposed between the first substrate and the fixing member;

a mold frame disposed under the display panel to support the display panel;

a lower receiving container which receives the display panel and the mold frame, and a supporting member which supports lower surfaces of the first substrate and the fixing member, and only overlaps a portion of the first substrate and a portion of the fixing member, wherein the mold frame comprises:

an outer portion surrounding an edge of the display panel;

a bottom portion extending from the outer portion to an inner direction; and a locking protrusion which is provided on an inner side surface of the outer portion, and configured to be interlocked with the fixing member.

2. The display apparatus of claim 1, wherein the bonding member includes a double sided tape comprising a rubber.

3. The display apparatus of claim 1, wherein the fixing member comprises:

a supporting portion facing an upper surface of the first substrate; and a side wall portion which extends from the supporting portion in a direction crossing a direction to which the supporting portion extends, and faces a side surface of the first substrate in a cross sectional view.

4. The display apparatus of claim 3, wherein a recess is defined in an outer side surface of the side wall portion, and the locking protrusion is disposed in the recess.

5. The display apparatus of claim 1, further comprising:

a fixing tape adhered to an upper surface of the mold frame and an upper surface of the fixing member.

6. The display apparatus of claim 1, wherein the fixing member has a frame shape in the plan view and an opening portion is defined in the fixing member.

7. The display apparatus of claim 1, wherein the first substrate and the second substrate have a rectangular shape, and the first substrate surrounds the second substrate in the plan view.

8. The display apparatus of claim 1, wherein the fixing member comprises a metal.

9. The display apparatus of claim 1, wherein the fixing member comprises at least one of polymethyl methacrylate and polycarbonate.

* * * * *